(No Model.) 2 Sheets—Sheet 1.

F. M. LEAVITT.
SHAFT COUPLING.

No. 552,532. Patented Jan. 7, 1896.

WITNESSES:
C. E. Ashley
H. W. Lloyd

INVENTOR:
Frank M. Leavitt,
By his Attorneys,
Arthur E. Draser & Co.

(No Model.) 2 Sheets—Sheet 2.

F. M. LEAVITT.
SHAFT COUPLING.

No. 552,532. Patented Jan. 7, 1896.

WITNESSES:
C. E. Ashley
I. W. Lloyd

INVENTOR:
Frank M. Leavitt,
By his Attorneys,
Arthur C. Fraser & Co.

UNITED STATES PATENT OFFICE.

FRANK M. LEAVITT, OF BROOKLYN, NEW YORK, ASSIGNOR TO THE E. W. BLISS COMPANY, OF SAME PLACE.

SHAFT-COUPLING.

SPECIFICATION forming part of Letters Patent No. 552,532, dated January 7, 1896.

Application filed July 29, 1895. Serial No. 557,415. (No model.)

*To all whom it may concern:*

Be it known that I, FRANK M. LEAVITT, a citizen of the United States, residing in Brooklyn, in the county of Kings and State of New York, have invented certain new and useful Improvements in Shaft-Couplings, of which the following is a specification.

This invention relates to friction-clutch shaft-couplings. Its object is to insure the proper centering of the two shaft ends when locked or coupled together. Friction shaft-couplings have been made both with and without means for centering the shafts relatively to one another. Without centering means there is liability that one or other or both of the shafts will get out of line, and when coupled together they may be coupled eccentrically, and hence will run untrue. To prevent this and hold the shaft ends in line and properly centered with each other, shaft-couplings have been made in which one of the coupling members has a hub fixed on the end of one shaft and embracing the end of the other, so as to hold them relatively concentric. This construction, however, has the practical disadvantage that when the coupling is disconnected and either shaft is driven while the other is stationary, there is a relative movement of rotation between the shaft-embracing socket in such hub and the end of the shaft entering such socket, which results in the socket being gradually enlarged by wear, so that it fails to keep the shafts properly centered, the wear as it increases permitting the shafts to get more and more out of center with one another. My invention aims to provide a centering device for such couplings which shall be free from this objection. To this end I so construct and connect the centering device that it is practically free from wear, since when the shafts are uncoupled the parts constituting the centering device are reciprocally out of contact, and hence not subject to wear.

Figure 1:
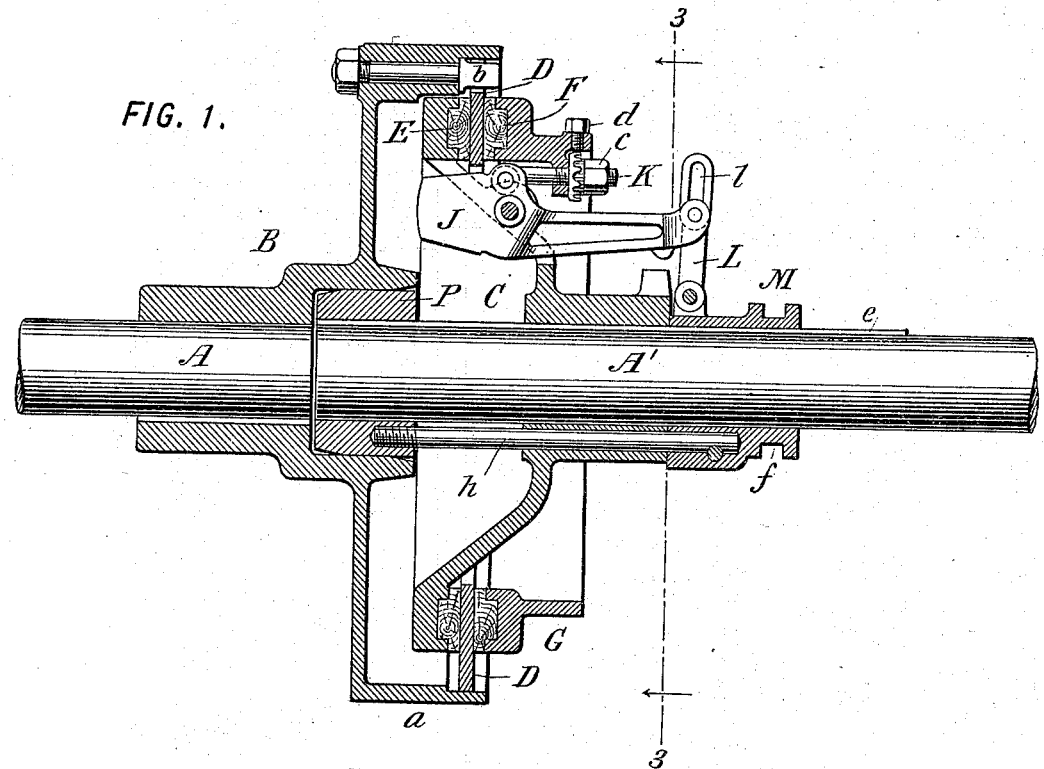
Figure 2:
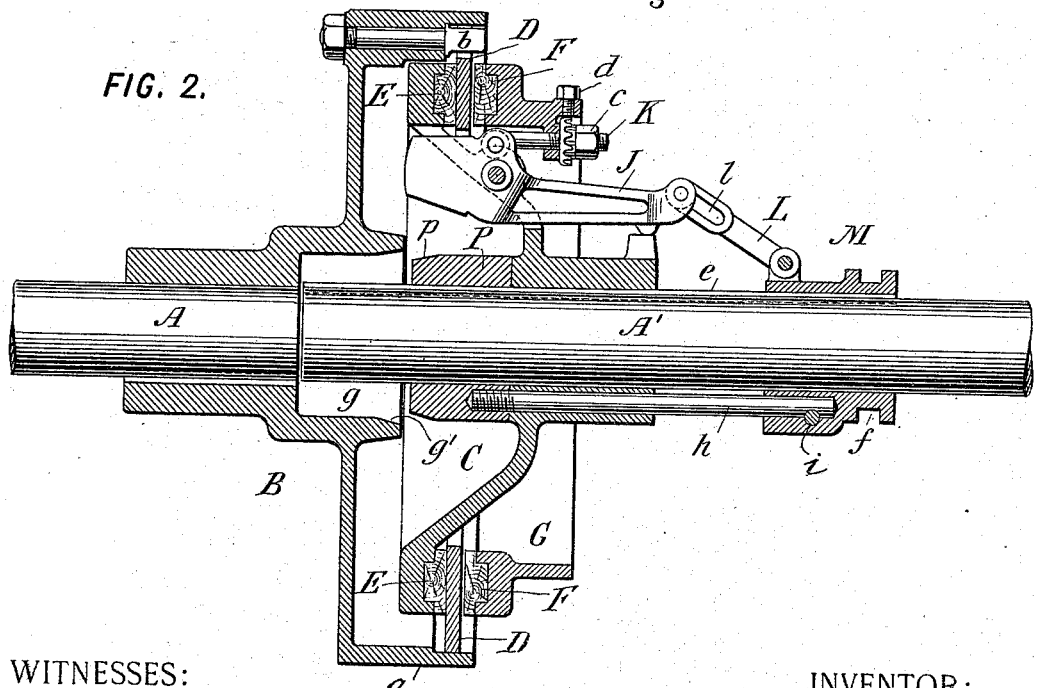
Figure 3:
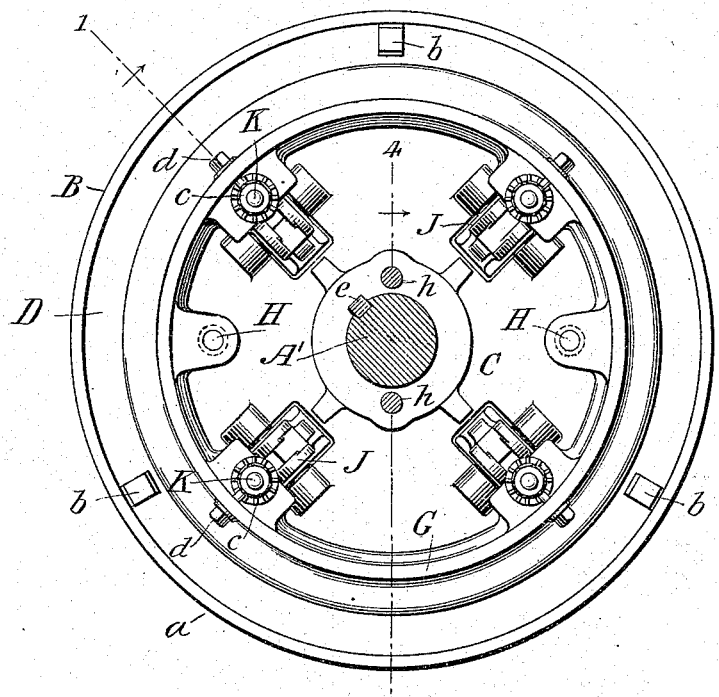
Figure 4:
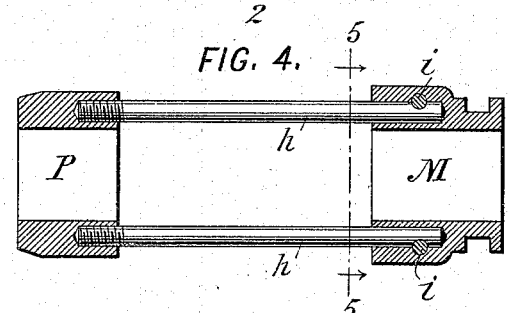
Figure 5:
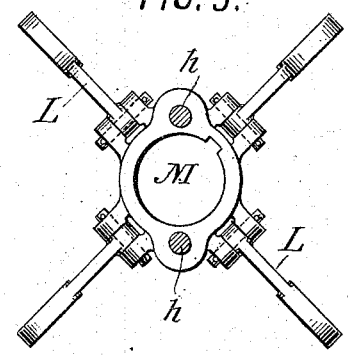

Figure 1 of the accompanying drawings is a longitudinal section in the two planes denoted by the line 1 2 in Fig. 3, showing the coupling applied to connect the shafts. Fig. 2 is a like section, except that the coupling is disconnected. Fig. 3 is a transverse section on the line 3 3 in Fig. 1. Fig. 4 is a section of part of the centering device in the plane of the line 2 4 in Fig. 3. Fig. 5 is a section on the line 5 5 in Fig. 4.

Let A and A' designate the two shafts which are to be coupled together, either of which may be the driving-shaft. Fixed to the respective shafts are the two clutch members B and C. These members, with the means for connecting them frictionally together, constitute the friction-clutch of the coupling. The construction of this clutch may be greatly varied, the particular construction shown being only one of numerous friction-clutch constructions that are applicable in connection with my invention. I will describe briefly this particular construction of clutch.

One of the clutch members carries a friction-ring and the other carries friction-shoes, between which the ring is clamped to apply the clutch. In the construction shown the friction-ring D is carried within an outer flange *a* on the member B, this member being somewhat in the shape of a pulley and having three or other number of driving-bolts *b* engaging corresponding notches in the ring D, the ring being thus free to move in a direction parallel with the axis of rotation. This ring stands between two friction-shoes E and F which are carried with the member C, and which may be in the form of rings, or may be arranged to intermittently engage the faces of the friction-ring. The shoe E is shown as applied directly to the member C, while the shoe F is shown as applied to a ring G carried with the member C by means of carrier-studs H H, Fig. 3, but adjustable toward and from the shoe E. For drawing the two shoes together levers J J are provided, of which four are shown in Fig. 3, but three or other number may be used. These levers are pivoted to the member C and are connected by adjustable links or eyebolts K K to the ring G. For adjusting the closeness with which the two shoes shall be drawn together by a given movement of the levers nuts *c* are provided, screwing on these eyebolts, and each nut having a notched flange engaged by the end of a set-screw *d* for fixing the nut in position after adjustment. The tails or long arms of the levers are engaged by toggle-links L L, each link being connected at one end to the lever and at the other end being jointed to the operating-sleeve M of the clutch. This operating-sleeve is splined on the shaft A′ by means of a feather e, and is formed with an annular groove f, as usual, to be engaged by a shifter fork or lever in the manner usual with revolving clutches. As thus far described this friction-clutch is of known construction and forms no necessary part of my invention. To apply the clutch the sleeve M is moved toward the left, so that a thrust is exerted through the links L against the levers J, so that the ring G is drawn up, thereby closing the shoes together and gripping the loose friction-ring D between them, the movement being continued until the links L pass to or preferably slightly beyond the position of perpendicularity to the rotative axis, as shown in Fig. 1.

My invention may now be understood. The hub of member B is formed with a recess g, Fig. 2, into which the end of the shaft A′ projects freely, and which recess should be made so large that no permissible amount of wabble of the shafts can cause the end of shaft A′ to touch the walls of the recess. The entrance to this recess is coned out or beveled, as shown at g′. A centering collar or cone P is provided, splined on the shaft A′ by means preferably of the same feather e, its exterior face being made a close working fit with the inner face of the socket g, and its advancing end being tapered or coned, as shown at p. This centering-cone P is connected, as shown in Fig. 4, with the sleeve M, preferably by means of two parallel sliding rods h h, which may conveniently be screwed into one of the parts at one end and fastened at the other end by a cross-pin i in the other part, or may be attached in any other convenient way. The construction is such that when the clutch is disconnected, as shown in Fig. 2, the cone P is withdrawn entirely from the recess g. This requires that the sleeve M shall be given a greater range of movement than is usually necessary in such clutches, and to admit of this, and also to effect the sequence of operations hereinafter described, the links L L instead of being jointed at their outer ends to the levers J J, as usual, are formed with elongated slots l l at their outer ends, engaging the pivotal studs or pivot-pins of the levers, or any other equivalent lost-motion device may be applied, this being mechanically the most convenient form of lost-motion device for the purpose.

The operation is as follows: Starting with the disconnected condition of the coupling shown in Fig. 2, to couple together the shafts the sleeve M is thrust toward the left. The first movement of the sleeve has no effect whatever on the clutch, since it is taken up in the lost-motion device or slots l. Its sole effect is to drive outward the centering-sleeve P, thereby forcing it to enter the recess g, and if the shafts are out of alignment the engagement of the coned surfaces p and g′ at once forces them into line, and by the engagement of the parallel surfaces of the sleeve and recess they are held in line. This centering action thus takes place before the clutching action commences by reason of the slots l. When, however, the length of these slots has been traversed, the links L begin to act upon the levers J, and consequently serve toward the end of the movement of the sleeve M to apply the clutch. Thus the shafts are first centered by the centering device and then coupled together by the clutch. Assuming that one of the shafts is in rotation, the act of coupling quickly starts the other shaft into rotation, so that almost immediately the two revolve together, and hence there is little or no wear on the centering-surfaces—that is, the parallel surfaces of the sleeve P and recess g. In uncoupling the shafts the first movement of the sleeve M withdraws the centering-sleeve P from the recess g, and the completion of the movement after the length of the slots l has been traversed is effective to pull inward the tails of the levers J, and thereby separate the friction-shoes of the clutch; or in case the construction of the clutch is such that it is released instantly upon being relieved of the outward pressure of the links, the first movement of the sleeve M simultaneously releases the clutch and withdraws the centering-sleeve. In either event the centering device is thrown out of engagement before any material slackening in speed of the driven shaft, so that there is little or no frictional rubbing such as would tend to wear the centering-surfaces. Hence the centering device may be expected to long outwear the friction-clutch proper, and hence will remain effective to accurately center the two shafts as long as the clutch continues operative.

My invention is not limited to any particular kind of friction-clutch, but is applicable to any friction-clutch in which the construction is such as to enable the clutching-sleeve to be given such a range of movement as will enable it to be utilized for throwing the centering device in or out.

I claim as my invention—

1. In a shaft coupling, the combination of a friction clutch, and a centering device, the latter so connected with the friction clutch that its relatively moving surfaces are adapted to move out of contact when the clutch is disengaged and to remain out of contact during the period of disengagement, and means to operate the friction clutch.

2. In a shaft coupling, the combination of a friction clutch and its operating means, with a centering device, the latter so connected with said operating means that its relatively moving surfaces are out of contact while the clutch is disengaged and are adapted to be brought together to center the shafts during the movement for engaging the clutch, substantially as specified.

3. In a shaft coupling, the combination of a friction clutch having an operating sleeve, and a centering device connected to said sleeve, in such manner that its relatively moving surfaces are out of contact while the sleeve is in the disengaged position, so that a single movement of the sleeve operates the centering device and applies the clutch, substantially as specified.

4. In a shaft coupling, the combination of a friction clutch having an operating sleeve, and a centering device connected to said sleeve, with a lost motion connection between the sleeve and the gripping members of the clutch, whereby the movement of the sleeve operates the centering device immediately and when the lost motion in said connection has been taken up it operates the clutch, substantially as specified.

5. In a shaft coupling, the combination of a friction clutch one member of which is fixed on one shaft and is formed with a concentric recess $g$, and the other member of which is mounted on the other shaft, the operating sleeve of said clutch mounted to slide on said latter shaft, and a centering device consisting of a centering sleeve sliding on the latter shaft and cooperating with said recess and connected to said operating sleeve in such manner that when the sleeve is retracted to disengage the clutch it is withdrawn from said recess, whereby when said sleeve is moved to apply the clutch it thrusts said centering sleeve into said recess to center the shafts, substantially as specified.

6. In a shaft coupling, the combination of a friction clutch having clutch members B and C fixed on the respective shafts, the clutch member B having a concentric recess $g$, a centering sleeve P movable to enter said recess and to retire out of contact therewith, and rods $h$ connecting this sleeve with the operating sleeve M of the clutch, substantially as specified.

7. In a shaft coupling the combination of a friction clutch comprising clutch members B and C fixed on the respective shafts, clamping levers J for effecting the clutching together of said members, an operating sleeve M, and toggle links L intervening between said sleeve and levers, said links being provided with lost motion connections adapted to render a portion of the movement of said sleeve ineffective to operate the clutch, and a centering device consisting of a centering sleeve P sliding on one shaft, cooperating with a recess $g$ concentric with the other shaft, and a mechanical connection between said centering sleeve and the operating sleeve, substantially as specified.

8. In a shaft coupling, the combination of a clutch member B fixed on one shaft and having a recess $g$, a clutch member C fixed on the other shaft, friction shoes E F, movable ring G, friction ring D, clutch levers J adapted to move said ring G to clamp said friction ring between said shoes, operating sleeve M, toggle links L connecting said sleeve with said levers and formed with lost motion slots $l$, centering sleeve P cooperating with said recess, and rods $h$ connecting said sleeve with the operating sleeve, substantially as specified.

In witness whereof I have hereunto signed my name in the presence of two subscribing witnesses.

FRANK M. LEAVITT.

Witnesses:
 WILLARD P. SCHENCK,
 FREDK. F. ALDRIDGE.